United States Patent
Sugiura et al.

(10) Patent No.: US 9,851,751 B2
(45) Date of Patent: Dec. 26, 2017

(54) INFORMATION PROCESSOR WITH TWO HOUSINGS

(71) Applicant: KABUSHIKI KAISHA TOSHIBA, Minato-ku, Tokyo (JP)

(72) Inventors: Yuusuke Sugiura, Tokyo (JP); Koichiro Takeguchi, Tokyo (JP); Tomofumi Miyamoto, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 230 days.

(21) Appl. No.: 14/717,696

(22) Filed: May 20, 2015

(65) Prior Publication Data
US 2016/0062484 A1    Mar. 3, 2016

(30) Foreign Application Priority Data
Aug. 29, 2014   (JP) .................................. 2014-175020

(51) Int. Cl.
G06F 3/0346   (2013.01)
G06F 1/16   (2006.01)
G06F 3/02   (2006.01)

(52) U.S. Cl.
CPC .......... *G06F 1/1626* (2013.01); *G06F 1/1632* (2013.01); *G06F 1/1643* (2013.01); *G06F 1/1677* (2013.01); *G06F 3/0202* (2013.01); *G06F 2200/1614* (2013.01); *G06F 2200/1631* (2013.01)

(58) Field of Classification Search
CPC .... G06F 1/1626; G06F 1/1677; G06F 1/1632; G06F 1/1643; G06F 3/0202; G06F 2200/1614; G06F 2200/1631
See application file for complete search history.

(56) References Cited

U.S. PATENT DOCUMENTS

| 6,937,468 B2 | 8/2005 | Lin et al. |
| 7,277,086 B2 | 10/2007 | Sugihara |
| 2008/0238816 A1* | 10/2008 | Matsushita ............. G06F 1/162 345/30 |
| 2012/0083206 A1* | 4/2012 | Obara ................... G06F 1/1632 455/41.1 |

FOREIGN PATENT DOCUMENTS

| JP | 2004-310659 | 11/2004 |
| JP | 2005-158013 | 6/2005 |
| JP | 2007-043243 | 2/2007 |
| JP | 2008-250835 | 10/2008 |

* cited by examiner

*Primary Examiner* — Andrew Sasinowski
(74) *Attorney, Agent, or Firm* — Knobbe, Martens, Olson & Bear, LLP

(57) ABSTRACT

An information processor includes a first housing including a display, a second housing including an input device, a connection terminal combined with the first housing so as to be detachable, and a hinge which couples the connection terminal to the second housing, and transforms a mode into an open state, a closed state, a standing state, or a tablet state. The display and the input device are operable in the open state. The display and the input device are inoperable in the closed state. The display and the input device are operable in the standing state. The display is operable, and the input device is inoperable in the tablet state.

9 Claims, 13 Drawing Sheets

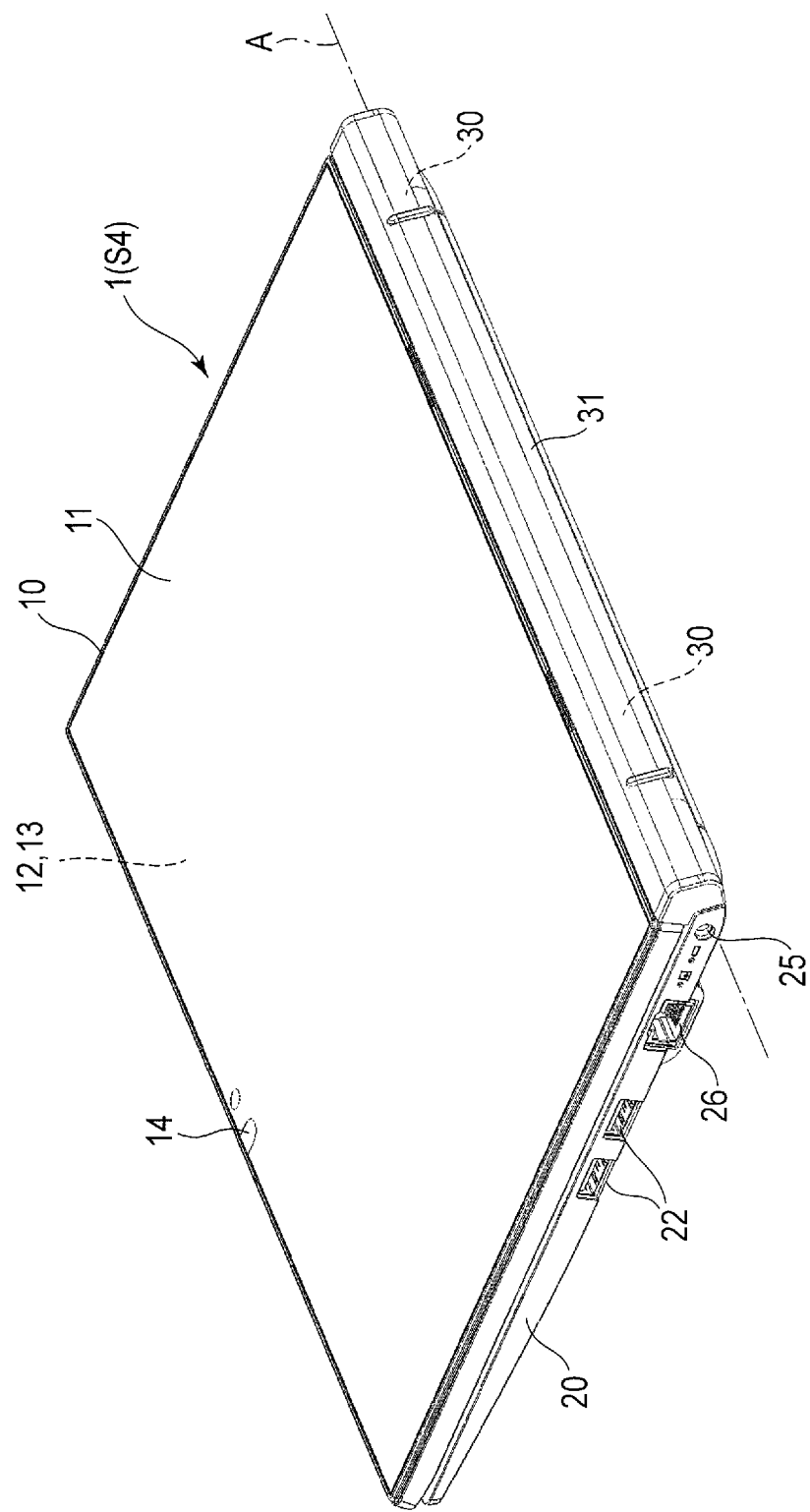
F I G. 5

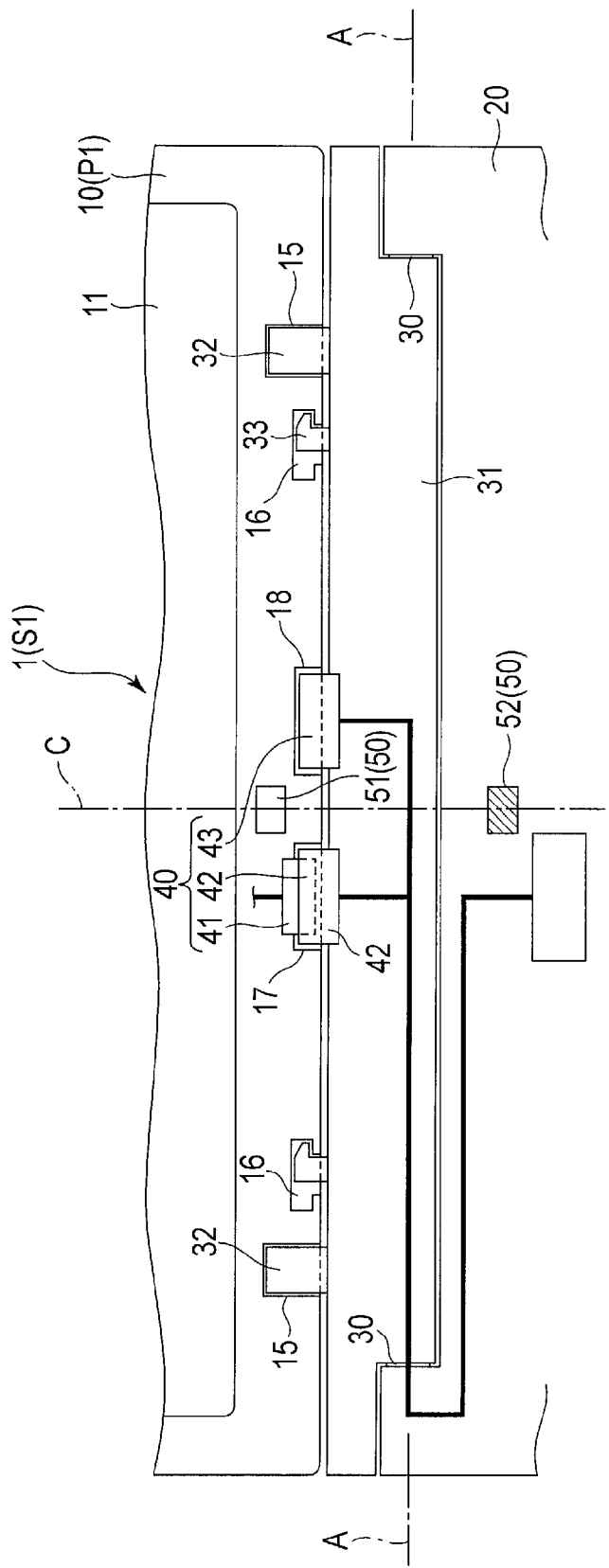
F I G. 6

| Detection | | States of use | Display module | Keyboard | Displaying image rotation function |
|---|---|---|---|---|---|
| Direction sensor | Proximity sensor | | | | |
| FRONT | OPEN | Closed state | ON | OPERABLE | UNAVAILABLE |
| FRONT | CLOSE | Open state | OFF | INOPERABLE | UNAVAILABLE |
| REAR | OPEN | Standing state | ON | OPERABLE | UNAVAILABLE |
| REAR | CLOSE | Tablet state | ON | INOPERABLE | AVAILABLE |

F I G. 7

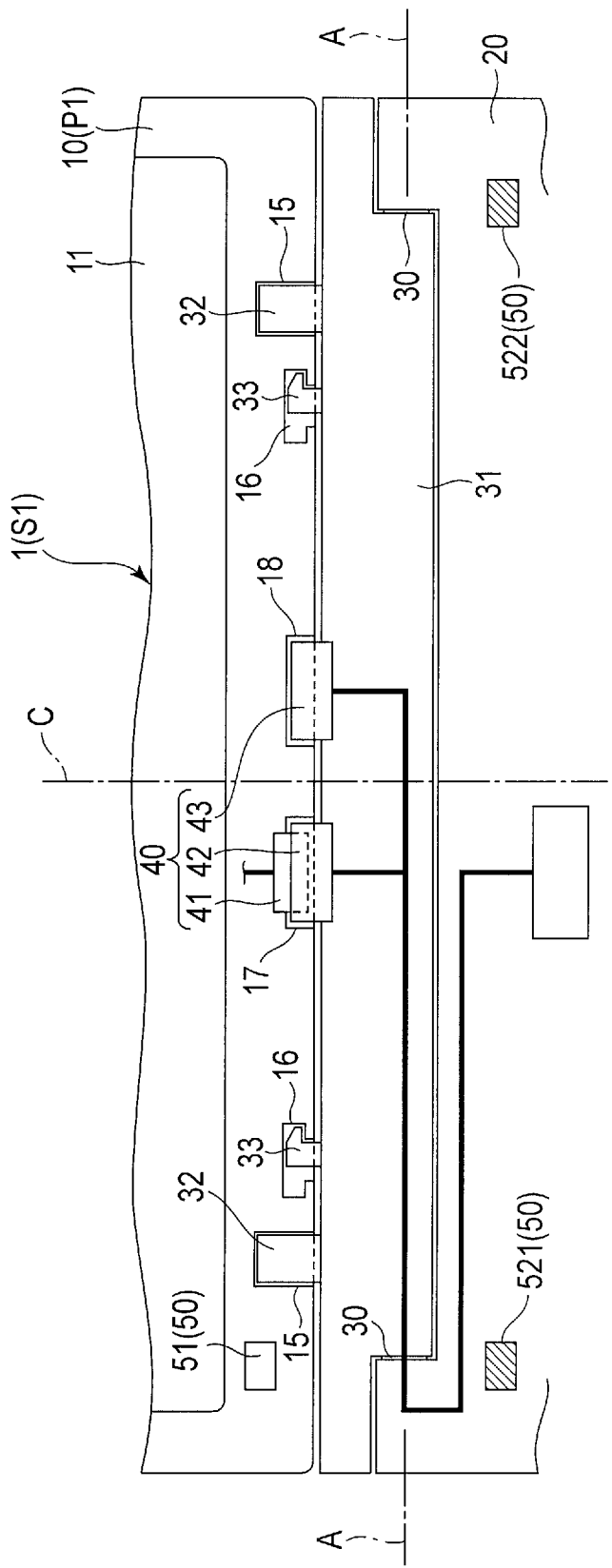
F I G. 8

INFORMATION PROCESSOR WITH TWO HOUSINGS

CROSS-REFERENCE TO RELATED APPLICATIONS

This application is based upon and claims the benefit of priority from Japanese Patent Application No. 2014-175020, filed Aug. 29, 2014, the entire contents of which are incorporated herein by reference.

FIELD

Embodiments described herein relate generally to an information processor which has capability to engage or to disengage a first case which is equipped with a display and a second case which is connected with the first case and is used for input operation.

BACKGROUND

In accordance with variety of the modes of use of the information processors, information processors capable of being used in response to each situation are required. There are a notebook (or clamshell) computer and a tablet computer as one type of a portable computer which is information processor. To respond to both the modes of use, there is a portable computer which can also be used as the notebook computer by connecting an extension device comprising a keyboard, etc. to the tablet computer. The portable computer functions as a notebook computer by allowing the tablet computer to be inserted into a connection terminal of the extension device coupled by a hinge.

In general, in the notebook computer, the operation control of turning off a display unit when the display unit is overlaid on a keyboard—so called "closed state"—, and activating the display unit when the display unit is made to stand up from the closed state—so called "open state"—, is often executed. To the contrary, in the tablet computer, the display unit is activated when the computer is used since the "closed state" and the "open state" cannot be distinguished from each other.

Therefore, for the portable computer having the functions of both the notebook computer and the tablet computer, the operation control of the display unit should be changed in accordance with the modes of use of the portable computer when used as the notebook computer or used as the tablet computer. In addition, not only for the display unit but also for input units such as a keyboard of an extension device, etc., it should be judged which the mode of use of the portable computer is, and should be choose a suitable operation control in accordance with the determined mode of use.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is a perspective view showing a tablet state of the information processor of FIG. 1.

FIG. 6 is a diagram showing a structure of a vicinity of the connection terminal in the information processor of FIG. 1.

FIG. 7 is a table showing operation conditions of modules in respective states, in the information processor of FIG. 1.

FIG. 8 is a diagram showing an arrangement of a proximity sensor in an information processor of a second embodiment.

DETAILED DESCRIPTION

In general, according to one embodiment, an information processor comprises a first housing comprising a display, a second housing comprising an input device, a connection terminal connect the second housing with the first housing so as to be detachable therefrom, and a hinge which couples the connection terminal to the second housing and holds the first housing at a desired angle with respect to the second housing. The connection terminal connects the second housing with the first housing in both a first connection state in which the display faces the input device, and a second connection state in which the display faces an opposite side of the input device. The information processor transforms a mode into an open state, a closed state, a standing state, or a tablet state. The open state is a state in which the first housing in the first connection state is held by the hinge to form an angle with the second housing, and the display and the input device are operable in the open state. The closed state is a state in which the first housing in the first connection state is held by the hinge, at a position overlaid on the second housing, and the display and the input device are inoperable in the closed state. The standing state is a state in which the first housing in the second connection state is held by the hinge to form an angle with the second housing, and the display and the input device are operable in the standing state. The tablet state is a state in which the first housing in the second connection state is held by the hinge, at a position overlaid on the second housing, and the display is operable, and the input device is inoperable, in the tablet state, wherein a direction of displaying image on the display is corrected.

That is, the information processor capable of controlling operations of the display and the input device in accordance with variable modes of use is provided.

An information processor 1 of a first embodiment will be described with reference to FIGS. 1 to 5. The information processor 1 can transforms a mode into a mode of use of serving as so called "clamshell computer" shown in FIG. 1 and a mode of use of serving as so called "tablet computer" shown in FIG. 5. For this reason, the information processor 1 has a structure in which a first housing 10 can be detached from a second housing 20 as shown in FIG. 2 and the first housing 10 can be reversed and combined as shown in FIG. 4.

For convenience of descriptions, in the present embodiment as used as the clamshell computer, a front side seen from the user is often called "front", a side away from the user is often called "rear", a side on which the computer is mounted on a desk, etc. is often called "lower (or bottom)", a direction of moving upwardly from the desk is often called "upper", and right and left sides seen from the user are called "right" and "left".

Figure 1:
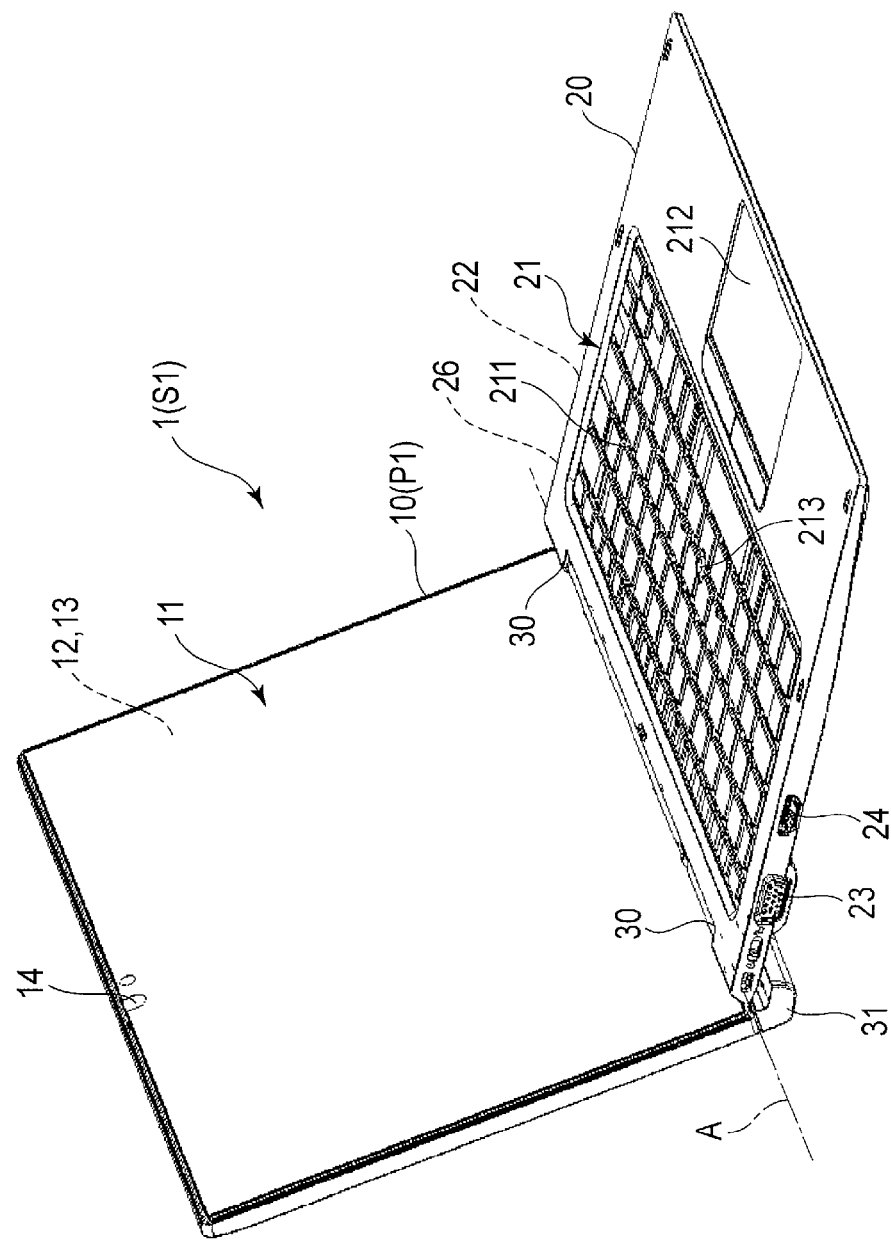
FIG. 1 is an exemplary perspective view showing an open state of an information processor of a first embodiment.
Figure 2:
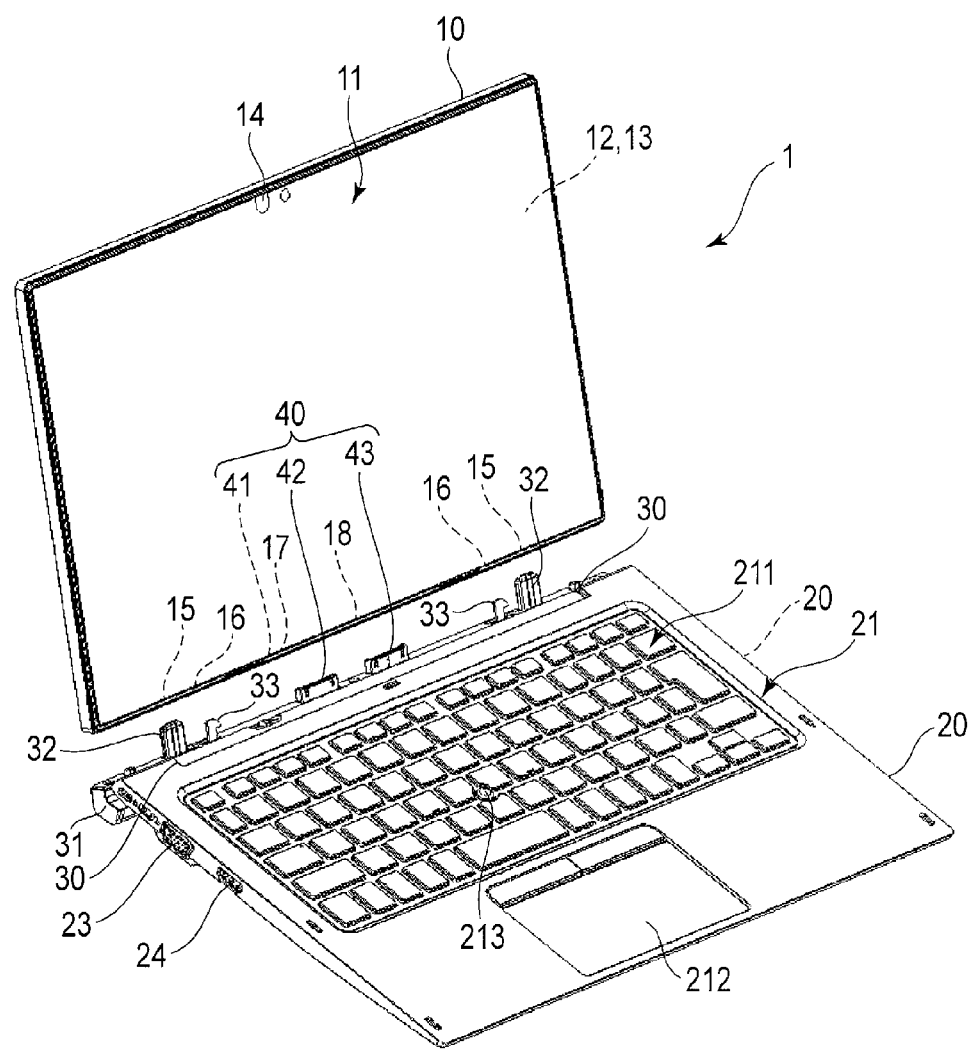
FIG. 2 is an exemplary perspective view showing detachment state of a first housing from a connection terminal, in the information processor of FIG. 1.

The information processor 1 comprises the first housing 10 comprising a display 11, the second housing 20 comprising an input device 21, a connection terminal 31 combined with the first housing 10 so as to be easily detached therefrom while facing the input device 21, and a hinge 30 coupling the connection terminal 31 to the second housing 20 to hold the first housing 10 about the second housing 20 at a desired angle, as shown in FIG. 1 and FIG. 2. At this time, the connection terminal 31 can be combined with the first housing 10 in normal connection P1 in which the connection terminal becomes in a first connection state of holding the first housing 10 while facing the display 11 toward the input device 21 as shown in FIG. 1 and FIG. 3 and in reversal connection P2 in which the connection terminal becomes in a second connection state of holding the first housing 10 while facing the display 11 toward an opposite side from the input device 21 as shown in FIG. 4 and FIG. 5.

Figure 3:
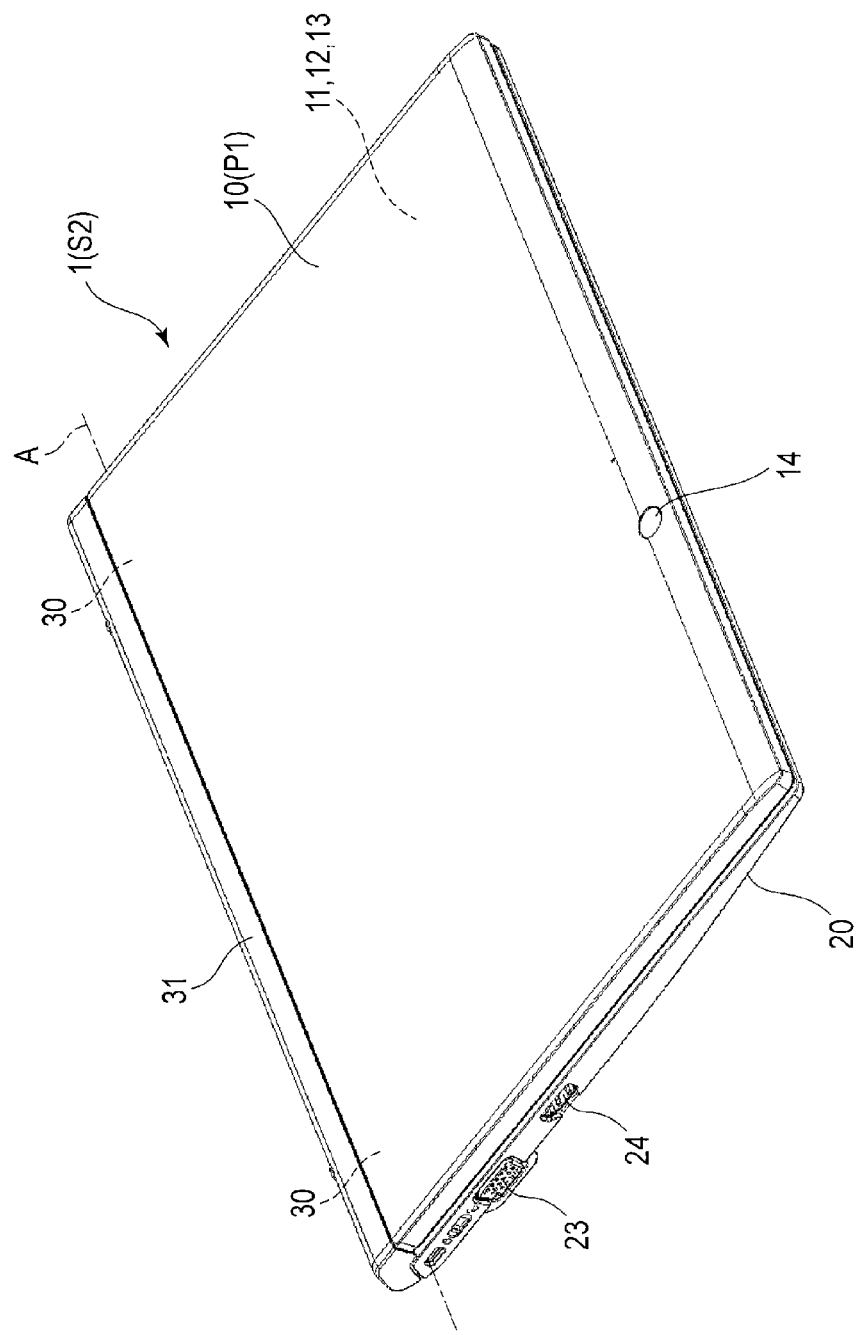
FIG. 3 is a perspective view showing a closed state of the information processor of FIG. 1.
Figure 4:
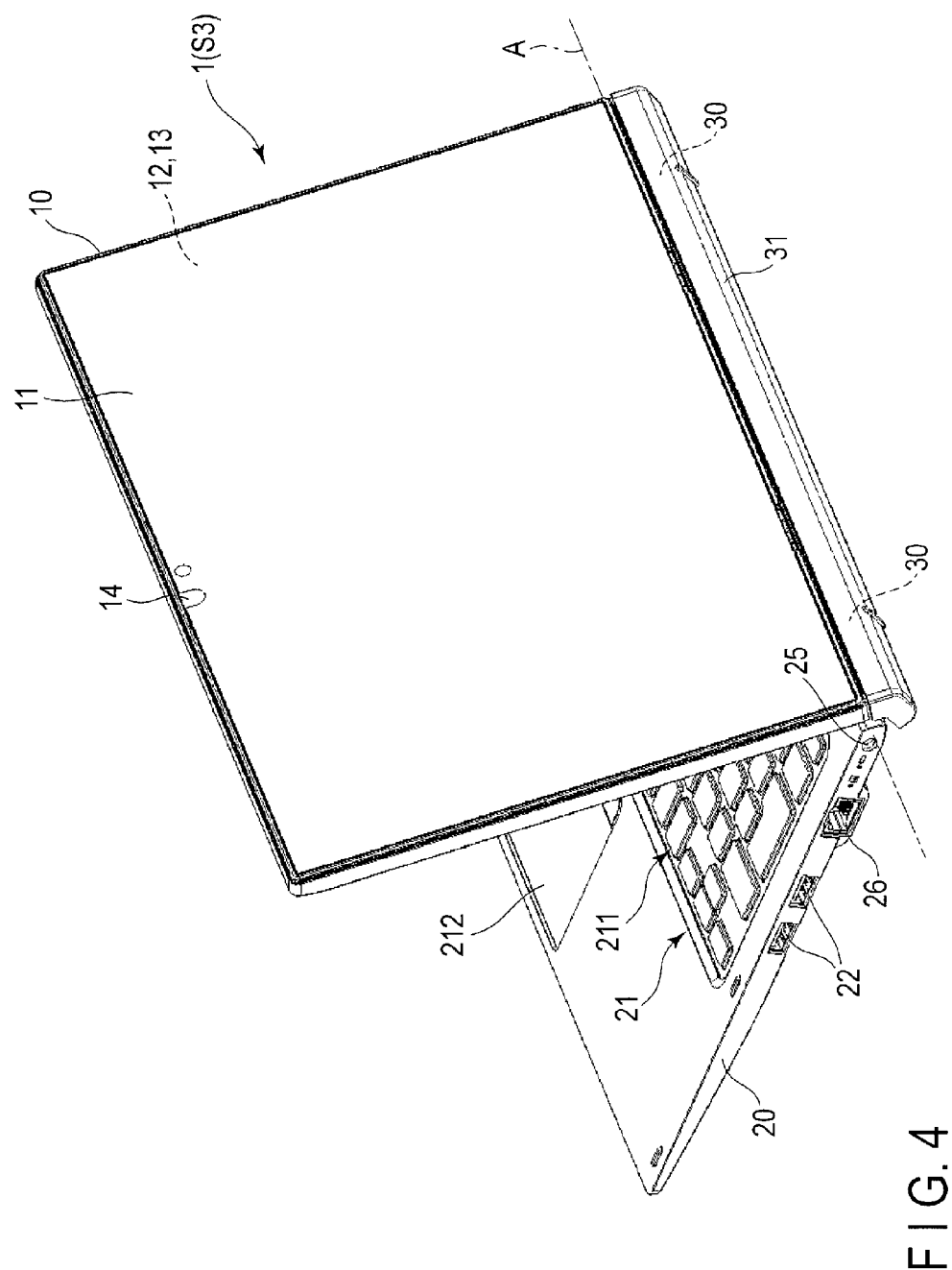
FIG. 4 is a perspective view showing a standing state of the information processor of FIG. 1.

Thus, the information processor 1 transforms a mode into the open state S1 shown in FIG. 1, the closed state S2 shown in FIG. 3, the standing state shown in FIG. 4, or the tablet state S4 shown in FIG. 5. The open state S1 is a state in which the first housing 10 in the normal connection (first connection state) P1 is held at an angle about the second housing 20, i.e., a state of using as the clamshell computer. The closed state S2 is a state in which the first housing 10 in the normal connection (first connection state) P1 is held at a position superposing the second housing 20 by the hinge 30, i.e., a state of not using the clamshell computer. The standing state S3 is a state in which the first housing 10 in the reversal connection (second connection state) P2 is held at an angle about the second housing 20. The tablet state S4 is a state in which the first housing 10 in the reversal connection (second connection state) P2 is held at a position superposing the second housing 20 by the hinge 30, i.e., a state of using as the information processor 1 as the tablet computer.

The first housing 10 also has a function of serving as the tablet computer by itself, and a touch panel 12, a digitizer 13 and a circuit board equipped with a control module are built in the first housing besides the display 11. The first housing 10 serving as the tablet computer may further comprise a camera 14, a speaker, a universal serial bus (USB) connector, a memory card slot, a headphone terminal, a video output terminal, a microphone, etc.

The second housing 20 comprises input devices such as a keyboard 211, a touchpad 212 and a pointing stick 213 as the input devices 21. In the present embodiment, the second housing 20 functions as the extension device for the first housing 10 which is the tablet computer, i.e., so called "keyboard dock". Therefore, the second housing 20 may be further equipped with a USB connector 22 (see FIG. 4 and FIG. 5), video output terminals 23 and 24 (see FIG. 1 and FIG. 3), a power connector 25 (see FIG. 4 and FIG. 5), a LAN connector 26 (see FIG. 4 and FIG. 5), a battery, a large capacity storage such as an HDD and an SSD, an optical drive, etc.

The hinge 30 is provided along an edge of the second housing 20 on a side (rear side) far from the side of the user using the keyboard 211, and is coupled to the second housing 20 so as to allow the connection terminal 31 to pivot, as shown in FIG. 1 and FIG. 2. The connection terminal 31 is combined with one of sides of the first housing 10 and pivots together with the first housing 10 about a rotary axis A of the hinge 30.

At this time, the first housing 10 of the present embodiment has a structure for being combined with the connection terminal 31 in the normal connection P1 in which the display 11 is faced toward the input device 21 side as shown in FIG. 1 and in reversal connection P2 in which the display 11 is faced toward an opposite side from the input device 21 as shown in FIG. 4.

More specifically, the first housing 10 has a pair of fitting holes 15 in point symmetry about a center C in a direction extending along the rotary axis A of the hinge 30, a pair of engagement holes 16 arranged inside the fitting holes, and recess portions 17 and 18 arranged inside the engagement holes 16, as shown in FIG. 6. A first connector 41 serving as an interface port for the input device 21 of the second housing 20, etc. is arranged in the one of recess portions 17. In other words, the first connector 41 is arranged at a position eccentric from the center C of the first housing 10 in the direction extending along the rotary axis A of the hinge 30.

In addition, the connection terminal 31 comprises a pair of projections 32 arranged in point symmetry from the center C in the direction extending along the rotary axis A of the hinge 30, a pair of hooks 33 arranged inside the projections 32 to move synchronously with each other in the same direction along the rotary axis A, and a second connector 42 and a third connector 43 serving as connectors for connecting the devices such as the keyboard 211 mounted on the second housing 20 with a control module of the first housing 10. The projections 32, the hooks 33, the second connector 42 and the third connector 43 correspond to fitting holes 15, the engagement holes 16, and the recess portions 17 and 18, respectively. The second connector 42 is arranged at a position where the second connector 42 is to be connected to the first connector 41 when the first housing 10 is in the normal connection P1, and the third connector 43 is arranged at a position where the third connector 43 is to be connected to the first connector 41 when the first housing 10 is in the reversal connection P2.

As shown in FIG. 6, the projections 32 of the connection terminal 31 and the fitting holes 15 of the first housing 10 are formed to substantially make no looseness, similarly to so called "tenon" and "mortise", and the projections 32 are fitted in the fitting holes 15, respectively, in both the normal connection P1 and the reversal connection P2. Outer surfaces of the projections 32 and inner surfaces of the fitting holes 15 may be plated with white metal or tin, or may be provided grooves and elongated protrusions extended along insertion direction on the surfaces, in consideration of operability at the insertion and extraction.

Since the hooks 33 move synchronously with each other in the same direction, the engagement holes 16 are formed in a T-letter shape having a narrow opening so as to allow the hooks 33 to engage in the engagement holes 16 in both the normal connection P1 and the reversal connection P2. If the hooks 33 are configured to move synchronously with each other so as to become close to each other toward the center C or to move synchronously with each other so as to become away from each other, holes bent in an L letter shape in the direction of being away from the center C or holes bent in an L letter shape toward the center C may be arranged in horizontal symmetry as the engagement holes 16.

The third connector 43 which is not connected to the first connector 41 in the normal connection P1 as shown in FIG. 6, or the second connector 42 which is not connected to the first connector 41 in the reversal connection P2 is inserted into the recess portion 18 of the first housing 10 where the first connector 41 is not arranged. To firmly fix the first housing 10 at the connection terminal 31, a dummy connector may be arranged at the recess portion 18. The first connector 41 further comprises a determining module which detects whether the first connector 41 is connected to the second connector 42 or the third connector 43. The determining module may be arranged at the first housing 10 or the second housing 20.

Besides the above-described constituent elements, the information processor 1 of the present embodiment comprises a direction sensor 40 which detects each of the normal connection P1 and the reversal connection P2, and a proximity sensor 50 which detects the state of the first housing 10 overlaid on the second housing 20, i.e., the state shown in FIG. 3 and FIG. 5.

The direction sensor 40 is constituted by the first connector 41, the second connector 42, the third connector 43, and the determining module. In the direction sensor 40, the determining module detects connection of the first connector 41 to the second connector 42, and determines the normal connection P1 state in which the display 11 is faced toward the input device 21 and the first housing 10 is combined with the connection terminal 31. In addition, the determining module detects connection of the first connector 41 to the third connector 43, and determines that the first housing 10 is in the reversal connection P2 state of being combined with the connection terminal 31 while facing the display 11 toward the side opposite to the input device 21.

The proximity sensor 50 comprises a magnetic sensor 51 arranged at the center C of the first housing 10 in the direction extending along the rotary axis A of the hinge 30, and a permanent magnet 52 arranged in the second housing 20, at a position detected by the magnetic sensor 51 in the state in which the first housing 10 is overlaid on the second housing 20, as shown in FIG. 6. The magnetic sensor 51 detects a magnetic field generated by the permanent magnet 52 when the first housing 10 approaches the position where the first housing 10 is overlaid on the second housing 20. It is determined based on a detection signal of the magnetic sensor 51 that the first housing 10 is overlaid on the second housing 20.

The information processor 1 constituted as described above determines whether the first housing is in the normal connection P1 or the reversal connection P2, by the direction sensor 40, based on the connection of the connector, and then determines whether the first housing 10 is overlaid on the second housing 20, by the proximity sensor 50, based on presence or absence of the magnetic field of the permanent magnet 52 detected by the magnetic sensor 51, as shown in FIG. 7. Then, the information processor 1 determines the open state S1, the closed state S2, the standing state S3 or the tablet state S4, and changes setting on whether each of the display (LCD) 11, the input device (keyboard) 21 and a function which rotates an image on the display 11 to correct a direction of the image based on the gravity, should be available (activated) or unavailable (inactivated), based on the determination results.

In FIG. 7, a "FRONT" of the direction sensor 40 indicates a state in which the display 11 is faced toward the front side for the user, i.e., the normal connection P1 state in which the first housing 10 is arranged while facing the display 11 toward the input device 21 and a state in which the first connector 41 is connected to the second connector 42, and a "REAR" indicates a state in which a rear side of the display 11 is facing toward the user, i.e., the reversal connection P2 state in which the first housing 10 is arranged while facing the display 11 toward the side opposite to the input device 21 and a state in which the first connector 41 is connected to the third connector 43. In addition, "OPENED" of the proximity sensor 50 indicates a state in which the first housing 10 forms an angle with the second housing 20, i.e., the open state, while "CLOSED" indicates a state in which the first housing 10 is overlaid on the second housing 20, i.e., the closed state in which the first housing 10 does not form an angle with the second housing 20.

As shown in FIG. 7, if the normal connection P1 i.e., the display 11 is faced toward the "FRONT" is detected by the direction sensor 40, and "OPENED" is detected by the proximity sensor 50, it is determined that the information processor 1 is used as the clamshell computer and the first housing 10 forms an angle with the second housing 20, i.e., the information processor 1 is in the open state S1 as shown in FIG. 1. In the open state S1, displaying of the display 11 and operating of the input device 21 are made available. Since the display 11 is not tilted in the open state S1, a function of rotating the image in accordance with the attitude of the information processor 1, based on a direction of application of the gravity, is made unavailable. When the touchpanel 12 and the digitizer 13 are built in the first housing 10 and when the touchpad 212 and the pointing stick 213 are built in the second housing 20, they are also made available.

If it is detected by the direction sensor 40 that the first housing is in the normal connection P1, i.e., that the display 11 is faced toward the "FRONT", and if "CLOSED" of the information processor 1 is detected by the proximity sensor 50, it is determined that the information processor 1 is used as the clamshell computer and that the first housing 10 is at a position of being overlaid on the second housing 20, i.e., the information processor 1 is in the closed state S2 as shown in FIG. 3. In the closed state S2, displaying of the display 11 and operating of the input device 21 are made unavailable, and the function of rotating the image is also made unavailable.

If it is detected by the direction sensor 40 that the first housing 10 is in the reversal connection P2, i.e., that the display 11 is faced toward the "REAR", and if "OPENED" of the information processor 1 is detected by the proximity sensor 50, it is determined that the information processor 1 is in the standing state S3 as shown in FIG. 4. In the standing state S3, displaying of the display 11 and operating of the input device 21 are made available respectively. In addition, the function of rotating the image is made unavailable.

If it is detected by the direction sensor 40 that the first housing 10 is in the reversal connection P2, i.e., that the display 11 is faced toward the "REAR", and if "CLOSED" of the information processor 1 is detected by the proximity sensor 50, it is determined that the information processor 1 is in the tablet state S4 as shown in FIG. 5. In the tablet state S4, displaying of the display 11 is made available, but operating of the input device 21 is made unavailable. Since the user often lifts and operates the information processor 1 in the tablet state S4, the function of rotating the image based on the direction of application of the gravity, is made available.

Even if the display 11 and the input device 21 are made unavailable in the closed state S2 or tablet state S4, when a keyboard and a mouse are connected to the USB connectors 22 provided on the second housing 20 as external input devices and when a monitor or a projector is connected to the video output terminal 23 (or 24) as an external display device, their use is not prevented.

The information processor 1 of the first embodiment configured as described above can correctly control the operations of the display 11 and the input device 21 in accordance with the mode of use. Since the proximity sensor 50 which detects overlaying of the first housing 10 on the second housing 20, is arranged at the center C of the first housing 10 in the direction extending along the rotary axis A of the hinge 30, both the closed state S2 and the tablet state S4 can be detected by merely adding minimal elements. Furthermore, the display 11 faced toward the front side needs to be turned so as to be faced toward the rear side such that the information processor 1 can be used as the clamshell computer and the tablet computer. Since the information processor 1 of the present embodiment is configured to allow the first housing 10 equipped with the display 11 to be detached therefrom, the hinge 30 is not structurally complicated or is not bulky. Therefore, the information processor 1 is hardly broken and has good-looking appearance since the structure of the hinge 30 is simple.

The information processor 1 can also be used in the standing state S3 shown in FIG. 4 owing to the above-described structure. In the standing state S3, the information processor 1 can be used at presentation for a small number of third parties or can be used as an unattended guidance device in an exhibition, etc., and can also be used as a desktop computer by making wired connection of the keyboard and mouse to the second housing 20 or wireless connection of the keyboard and mouse to the first housing 10.

Information processors 1 of second to seventh embodiments will be hereinafter described with reference to the drawings. In each of the embodiments, elements having same or similar function of the elements in the information processor 1 of the first embodiment are denoted by the same reference numbers of the elements of the information processor 1 of the first embodiment, and the descriptions and drawings of the first embodiment are referred to as detailed descriptions of the embodiments. The information processor 1 of each of the second to seventh embodiments is different from the information processor 1 with respect to the structure of the proximity sensor 50.

The information processor 1 of the second embodiment will be described with reference to FIG. 8. A proximity sensor 50 of the information processor 1 comprises a magnetic sensor 51 arranged at a position eccentric from a center C of a first housing 10 in a direction extending along a rotary axis A of a hinge 30, a first permanent magnet 521 arranged in a second housing 20, at a position detected by the magnetic sensor 51 in a closed state S2, and a second permanent magnet 522 arranged in the second housing 20, at a position detected by the magnetic sensor 51 in a tablet state, as shown in FIG. 8. More specifically, the magnetic sensor 51 is built in an edge of the first housing 10 close to a connection terminal 31 at a left side as seen from the user. Therefore, the first permanent magnet 521 is built in the second housing 20 in a range opposed to the magnetic sensor 51 (i.e., a left rear corner of the second housing 20 as seen from the user) in the closed state S2, and the second permanent magnet 522 is built in the second housing 20 in a range opposed to the magnetic sensor 51 (i.e., a right rear corner of the second housing 20 as seen from the user) in a tablet state S4. Ferromagnets may be arranged instead of the first permanent magnet 521 and the second permanent magnet 522 since variation of a magnetic field needs only to be detected by the magnetic sensor 51.

According to the information processor 1 of the second embodiment, a degree of freedom in the arrangement of the proximity sensor 50 is increased since the arrangement of the magnetic sensor 51 of the proximity sensor 50 is not limited to the center C of the first housing 10. For example, the proximity sensor 50 can be arranged not only near the hinge 30, but at a position far from the hinge 30. In addition, the magnetic sensor 51 of the proximity sensor 50 may be provided in the second housing 20 and both the first permanent magnet 521 and the second permanent magnet 522 may be built in the first housing 10. At this time, instead of the permanent magnets, materials capable of bringing variation in the magnetic field to the magnetic sensor 51, such as ferromagnets may be employed.

Figure 9:
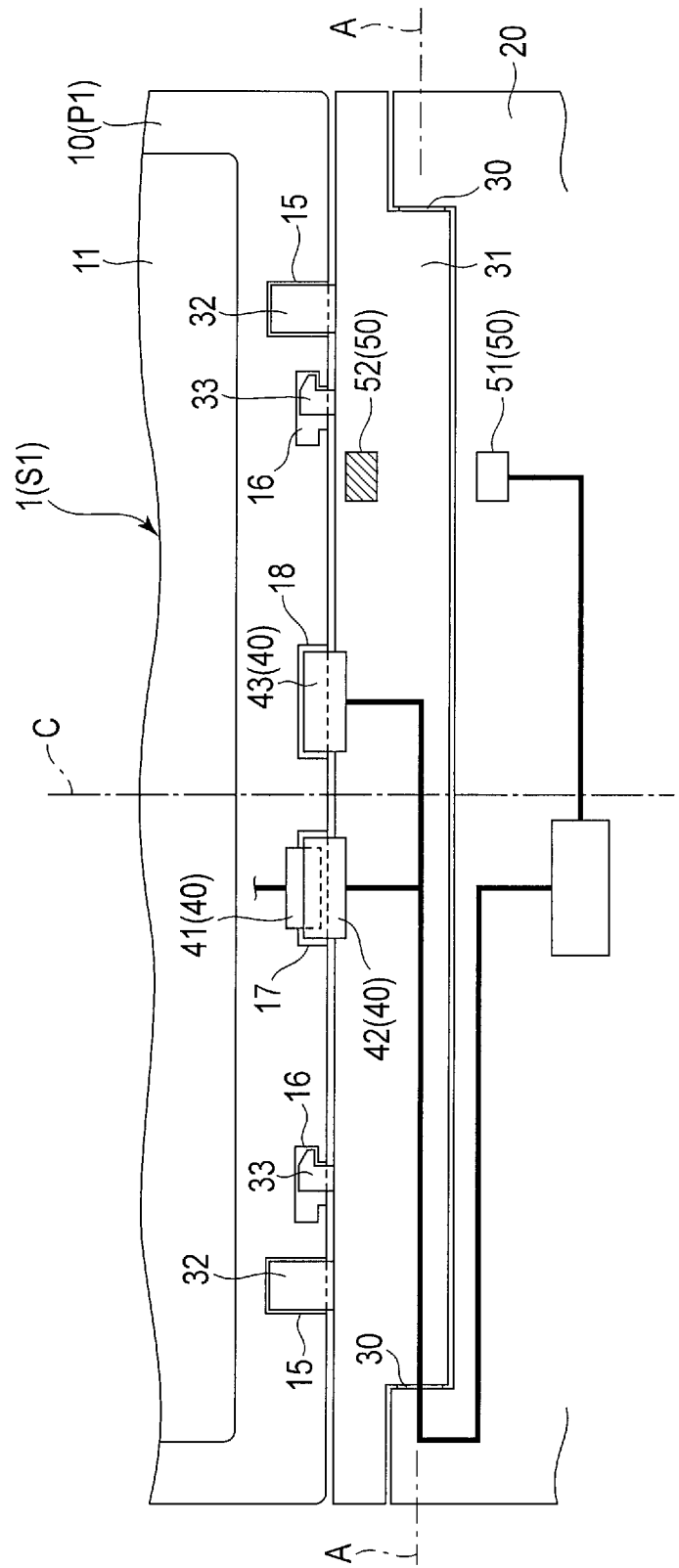
FIG. 9 is a diagram showing an arrangement of a proximity sensor in an information processor of a third embodiment.

The information processor 1 of the third embodiment will be described with reference to FIG. 9. A proximity sensor 50 of the information processor 1 comprises a permanent magnet 52 arranged at a connection terminal 31 opposed to a second housing 20 in a closed state S2 and a tablet state S4, and a magnetic sensor 51 arranged in the second housing, at a position where a magnetic field of the permanent magnet 52 is to be detected, in the closed state S2 and the tablet state S4, as shown in FIG. 9.

According to the information processor 1 of the third embodiment, the magnetic sensor 51 of the proximity sensor 50 may be arranged at any position where the magnetic field of the permanent magnet 52 can be detected between the connection terminal 31 and the second housing 20, in the closed state S2 and the tablet state S4. In other words, the permanent magnet 52 may be arranged at a part of the connection terminal 31 apart from the second housing 20 in a open state S1 and a standing state S3, and the magnetic sensor 51 may be arranged in the second housing 20, at a position opposed to the permanent magnet 52, in the closed state S2 and the tablet state S4. In addition, the magnetic sensor 51 may be built in a part of the connection terminal 31, and the permanent magnet 52 may be arranged in the second housing 20, at a position opposed to the magnetic sensor 51. Since a plurality of magnets and sensors do not need to be arranged in response to a case where the first housing 10 is in the normal connection P1 and a case where the first housing 10 is in the reversal connection P2 but a pair of magnet and sensor may be arranged between the connection terminal 31 and the second housing 20, and since the magnet and the sensor may be displaced from the center C of the first housing 10, in a direction extending along a rotary axis A of the hinge 30, a degree of freedom in the arrangement of the proximity sensor 50 is further increased.

Figure 10:
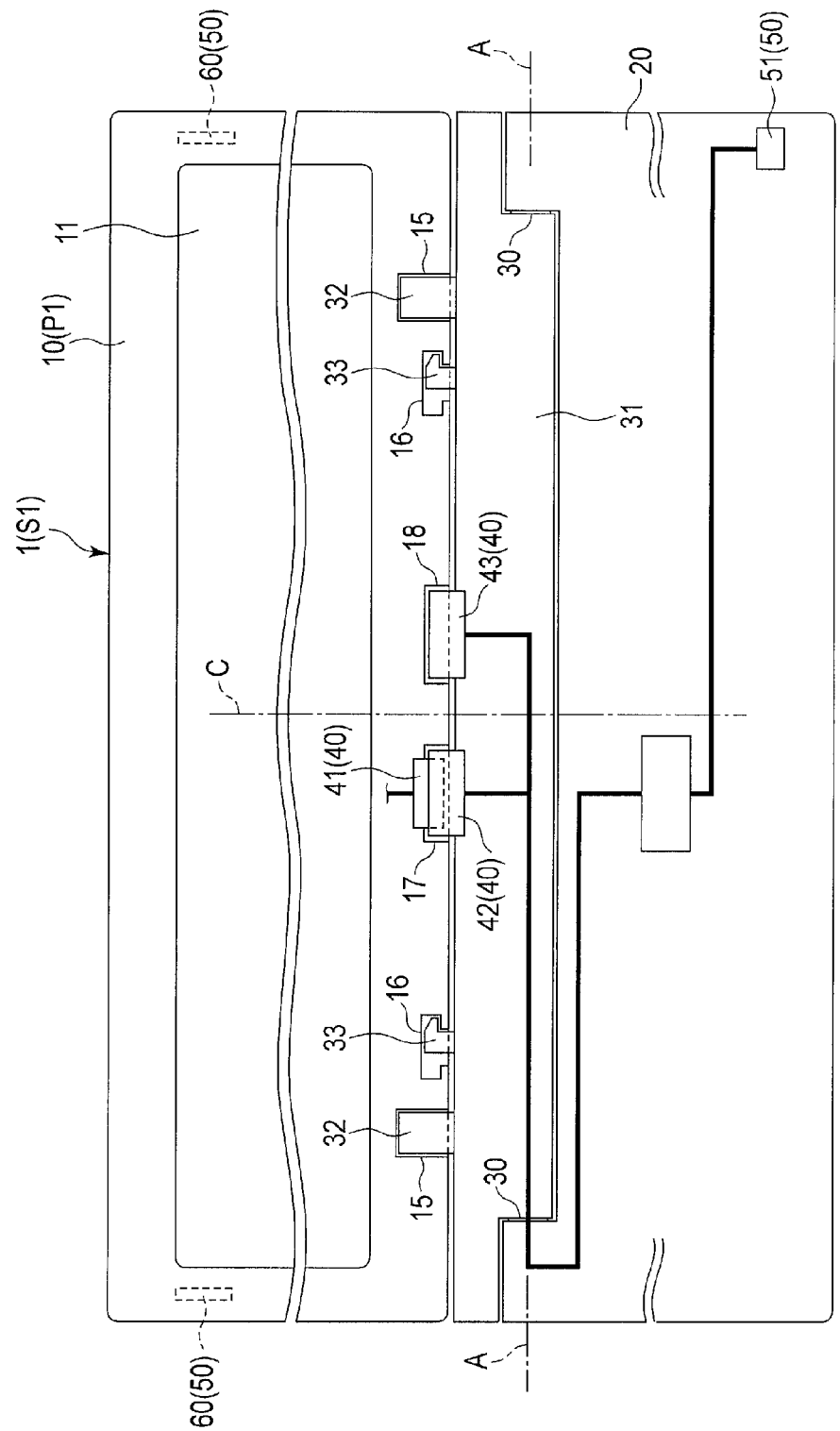
FIG. 10 is a diagram showing an arrangement of a proximity sensor in an information processor of a fourth embodiment.

The information processor 1 of the fourth embodiment will be described with reference to FIG. 10. A proximity sensor 50 of the information processor 1 uses permanent magnets of a pair of speakers 60 arranged in a first housing 10 as permanent magnets 52. Thus, the proximity sensor 50 comprises a pair of speakers 60 arranged in the first housing 10 and separated from each other in a direction extending along a rotary axis of a hinge, and a magnetic sensor 51 arranged in a second housing 20 opposed to at least one of the speakers 60, in a closed state S2 and a tablet state S4.

In the first housing 10 that can also be used as a tablet computer by itself, similarly to the first embodiment, the pair of speakers 60 are arranged to provide stereo sounds. Therefore, if the magnetic sensor 51 is arranged in the second housing 20, at a position where the magnetic field generated by permanent magnets of the speakers 60 can be detected, the closed state S2 and the tablet state S4 can be detected. In the information processor 1 of the [third] fourth embodiment, the speakers 60 are arranged at outer peripheral portions of the first housing 10 on sides far from the hinge 30, and the magnetic sensor 51 is arranged at a position corresponding to the right speaker 60 (i.e., a right front edge of the second housing 20 seen from the user side). Since they are arranged at positions sufficiently separated from each other in an open state S1 and a standing state S3, the magnetic sensor 51 can be set easily. In addition, since the permanent magnets of speakers 60 are used, a permanent magnet does not need to be newly built in the first housing 10, and since the magnetic sensor 51 is arranged in the second housing 20, a sensor and its line do not need to be built in the first housing 10.

Figure 11:
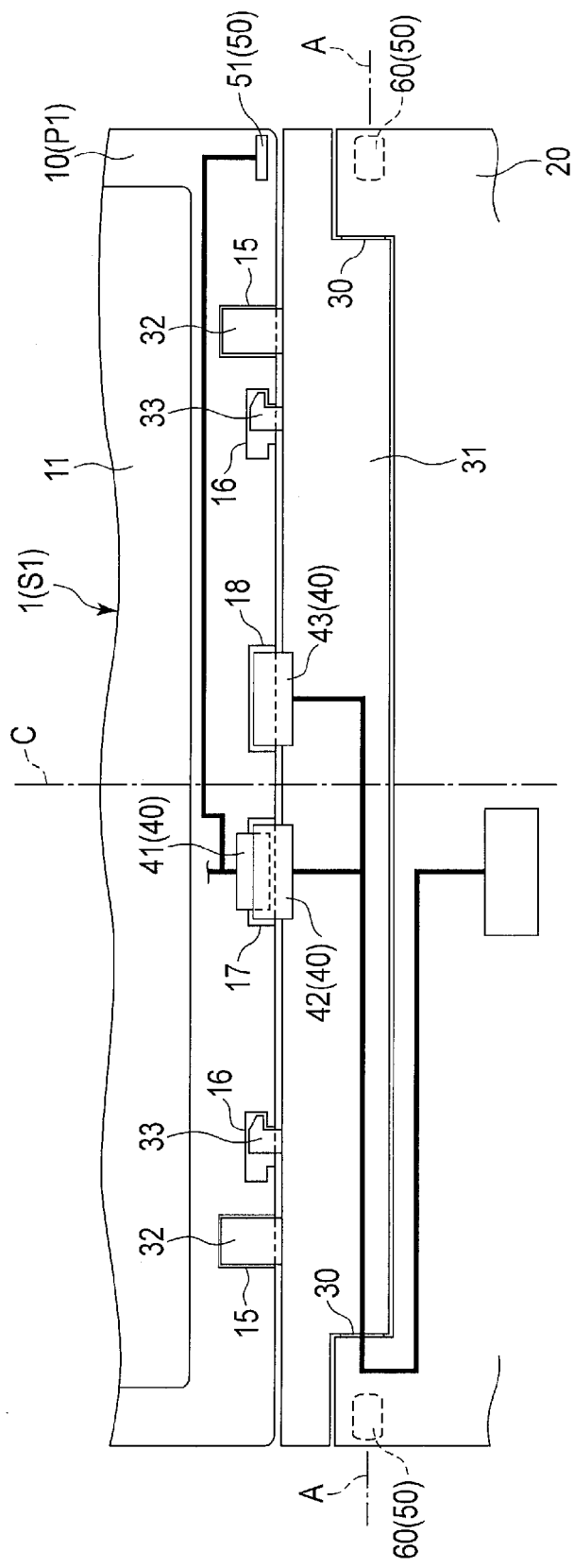
FIG. 11 is a diagram showing an arrangement of a proximity sensor in an information processor of a fifth embodiment.

The information processor 1 of the fifth embodiment will be described with reference to FIG. 11. A proximity sensor 50 of the present embodiment comprises a pair of speakers arranged in a second housing 20 and separated from each other in a direction extending along a rotary axis A of a hinge 30, and a magnetic sensor 51 arranged in a first housing 10 opposed to at least one of speakers 60, in a closed state S2 and a tablet state S4, as shown in FIG. 11.

According to the information processor 1 of the fifth embodiment, since permanent magnets of the speakers 60 provided in the second housing 20 which functions as an expansion device, for the first housing 10 which functions as a tablet computer, a permanent magnet does not need to be newly arranged in the second housing 20, similarly to the fourth embodiment. The speakers 60 are arranged in the second housing 20 at positions close to the hinge 30 in FIG. 11. However, the speakers 60 may be arranged at front edge of the second housing 20 as seen from the user side. In that case, the magnetic sensor 51 may be arranged at an edge of the first housing 10 on a side far from the connection terminal 31.

Figure 12:
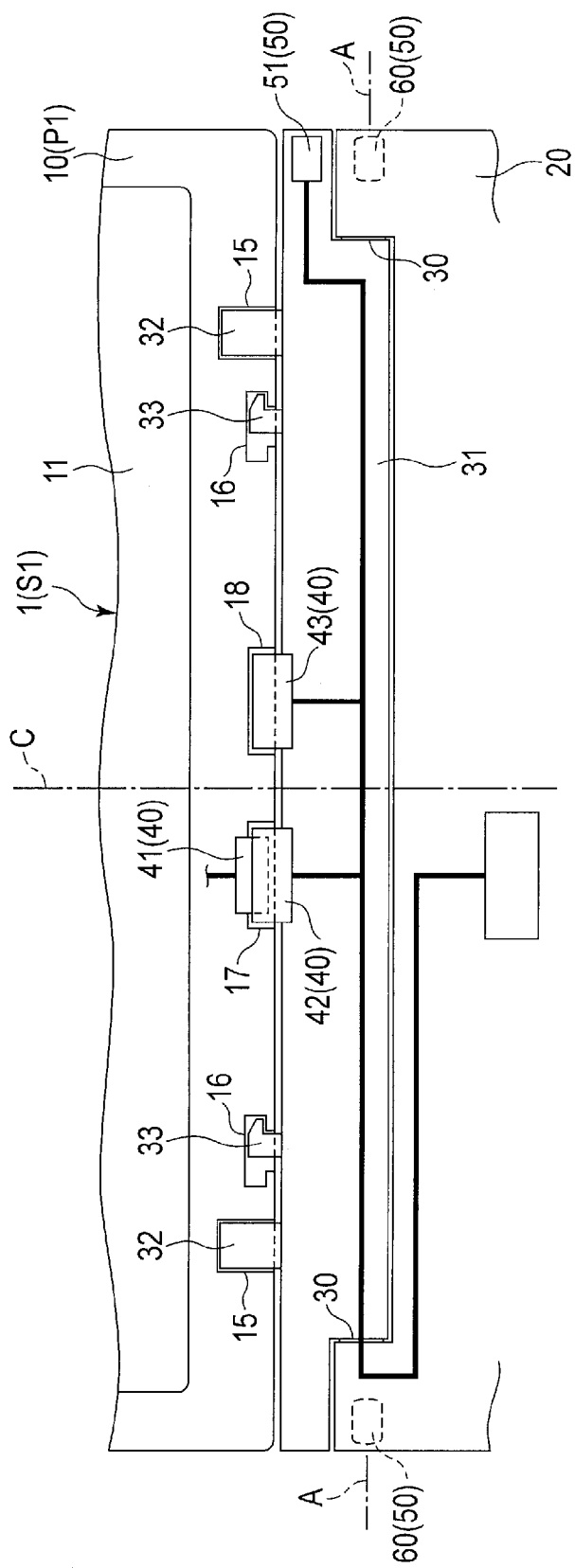
FIG. 12 is a diagram showing an arrangement of a proximity sensor in an information processor of a sixth embodiment.

The information processor 1 of the sixth embodiment will be described with reference to FIG. 12. A proximity sensor 50 of the information processor 1 comprises a pair of speakers 60 arranged in a second housing 20 and separated from each other in a direction extending along a rotary axis A of a hinge 30, and a magnetic sensor 51 arranged in a place of the connection terminal 31 opposed to at least one of the speakers 60, in a closed state S2 and a tablet state S4, as shown in FIG. 12.

According to the information processor 1 of the sixth embodiment, the proximity sensor 50 does not have a structure of being built in the first housing 10. Design of the structure of the first housing 10 therefore may not be changed. In addition, since permanent magnets of speakers 60 are used, the magnetic sensor 51 may be arranged to correspond to either of the speakers 60. If the magnetic sensor 51 is arranged to correspond to both the speakers 60, detection accuracy is enhanced and probability of failure is lowered.

Figure 13:
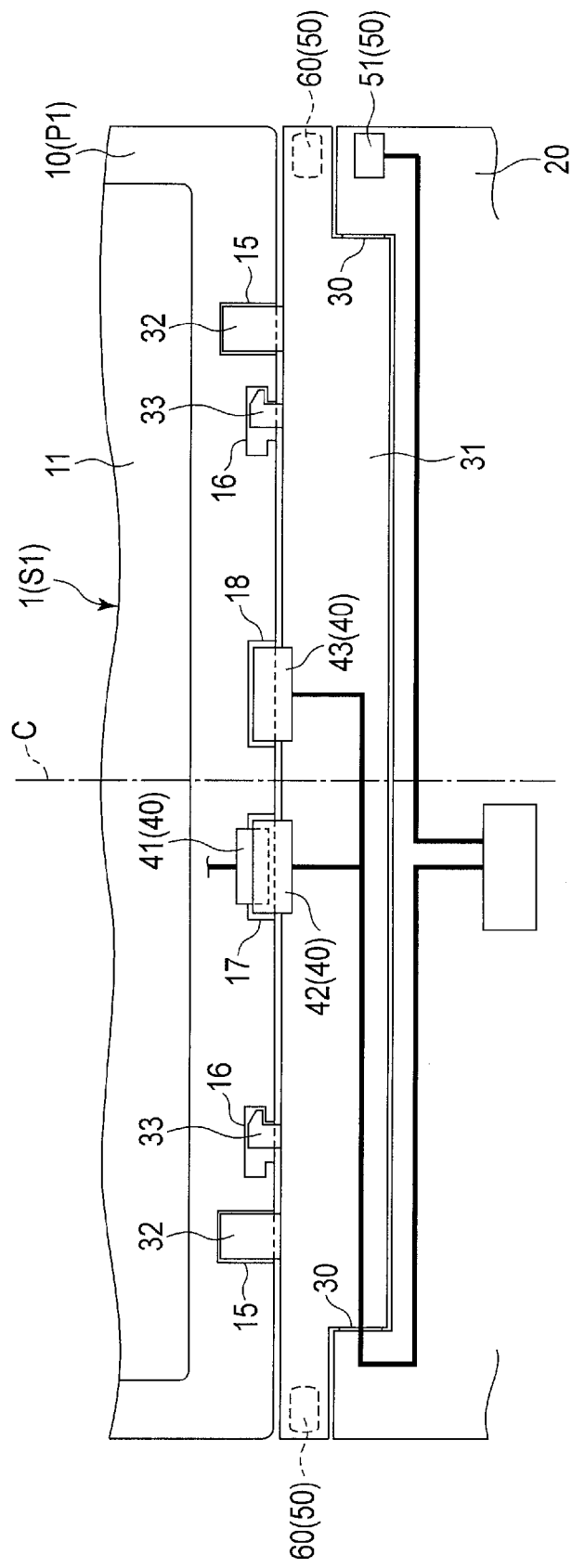
FIG. 13 is a diagram showing an arrangement of a proximity sensor in an information processor of a seventh embodiment.

The information processor 1 of the seventh embodiment will be described with reference to FIG. 13. A proximity sensor 50 of the information processor 1 comprises a pair of speakers 60 arranged in a connection terminal 31 and separated from each other in a direction extending along a rotary axis A of a hinge 30, and a magnetic sensor 51 arranged in a second housing 20 opposed to at least one of the speakers 60 in a closed state S2 and a tablet state S4, as shown in FIG. 13. In the proximity sensor 50 of the information processor 1 of the seventh embodiment, compared with the proximity sensor 50 of the information processor 1 of the sixth embodiment, arrangement of the speakers 60 is replaced with arrangement of the magnetic sensor 51. By arranging the magnetic sensor 51 on the second housing 20 side, workability of assembly is enhanced and sensibility of the magnetic sensor 51 can easily adjusted.

In addition, according to the information processors 1 of the third, sixth and seventh embodiments, an operation test of the proximity sensor 50 can be executed in a state in which the first housing 10 is not combined with the connection terminal 31, i.e., in the second housing 20 alone to which the connection terminal 31 is coupled by the hinge 30.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

What is claimed is:
1. An information processor comprising:
a first housing comprising a display;
a second housing comprising an input device;
a connection terminal configured to connect the second housing with the first housing in a first connection state in which the display faces the input device, and a second connection state in which the display faces an opposite side of the input device;
a hinge which couples the connection terminal to the second housing and holds the first housing at a desired angle with respect to the second housing;
a proximity sensor configured to detect a state in which the first housing overlays on the second housing; and
a direction sensor comprising:
a first connector at a position eccentric from a center of the first housing in a direction extending along a rotary axis of the hinge;
a second connector in the connection terminal, at a position connected to the first connector in the first connection state;
a third connector in the connection terminal, at a position connected to the first connector in the second connection state; and
a determining module which detects which of the second connector and the third connector the first connector is connected to,
wherein:
the display and the input device are operable in an open state in which the first housing in the first connection state is held by the hinge to form an angle with the second housing,
the display and the input device are inoperable in a closed state in which the first housing in the first connection state is held by the hinge at a position overlaid on the second housing, the display and the input device are operable in a standing state in which the first housing in the second connection state is held by the hinge to form an angle with the second housing, the display is operable, and the input device is inoperable, in a tablet state in which the first housing in the second connection state is held by the hinge at a position overlaid on the second housing, wherein a direction of displaying images on the display is corrected.

2. The information processor of claim 1, wherein the first housing comprises a recess portion for accepting the third connector in the first connection state and the second connector in the second connection state respectively.

3. The information processor of claim 1, wherein the proximity sensor is configured to detect one of the closed state and the tablet state, and comprises:
   a magnetic sensor at the center of the first housing in the direction extending along the rotary axis of the hinge; and
   a permanent magnet at a center of the second housing, at a position opposite to the magnetic sensor.

4. The information processor of claim 1, wherein the proximity sensor is configured to detect one of the closed state and the tablet state, and comprises:
   a magnetic sensor at a position eccentric from the center of the first housing in the direction extending along the rotary axis of the hinge;
   a first permanent magnet in the second housing, at an eccentric position opposite to the magnetic sensor in the closed state; and
   a second permanent magnet in the second housing, at an eccentric position opposite to the magnetic sensor in the tablet state.

5. The information processor of claim 1, wherein the proximity sensor is configured to detect one of the closed state and the tablet state, and comprises:
   a permanent magnet at the connection terminal; and
   a magnetic sensor in the second housing, at a position opposite to detecting a magnetic field of the permanent magnet.

6. The information processor of claim 1, wherein the proximity sensor is configured to detect one of the closed state and the tablet state, and comprises:
   permanent magnets built in a pair of speakers at both ends in the first housing, in the direction extending along the rotary axis of the hinge; and
   a magnetic sensor in the second housing, at a position opposite to at least one of the permanent magnets.

7. The information processor of claim 1, wherein the proximity sensor is configured to detect one of the closed state and the tablet state, and comprises:
   permanent magnets built in a pair of speakers at both ends in the second housing, in the direction extending along the rotary axis of the hinge; and
   a magnetic sensor arranged in the first housing, at a position opposite to at least one of the permanent magnets.

8. The information processor of claim 1, wherein the proximity sensor is configured to detect one of the closed state and the tablet state, and comprises:
   permanent magnets built in a pair of speakers at both ends in the second housing, in the direction extending along the rotary axis of the hinge; and
   a magnetic sensor in the connection terminal, at a position opposite to at least one of the permanent magnets.

9. The information processor of claim 1, wherein the proximity sensor is configured to detect one of the closed state and the tablet state, and comprises:
   permanent magnets built in a pair of speakers at both ends in the connection terminal, in the direction extending along the rotary axis of the hinge; and
   a magnetic sensor arranged in the second housing, at a position opposite to at least one of the permanent magnets.

* * * * *